United States Patent [19]

Vallery

[11] Patent Number: 4,630,633
[45] Date of Patent: Dec. 23, 1986

[54] STEAM TRAP CHECKER

[75] Inventor: Stafford J. Vallery, New Braunfels, Tex.

[73] Assignee: Armstrong International, Inc., Three Rivers, Mich.

[21] Appl. No.: 775,903

[22] Filed: Sep. 13, 1985

[51] Int. Cl.$^4$ ............................................. F17T 1/28
[52] U.S. Cl. ..................................... 137/185; 137/558
[58] Field of Search ............... 137/185, 183, 558, 551; 73/200

[56] References Cited

U.S. PATENT DOCUMENTS

| | | |
|---|---|---|
| 3,892,256 | 7/1975 | Schlesch . |
| 4,096,876 | 6/1978 | Ulrich . |
| 4,149,557 | 4/1979 | Keech et al. . |
| 4,305,548 | 12/1981 | Miner et al. . |
| 4,308,889 | 1/1982 | Lin ..................................... 137/187 |
| 4,456,173 | 6/1984 | Miner . |
| 4,468,962 | 9/1984 | Keech et al. . |

FOREIGN PATENT DOCUMENTS

2022846 9/1982 United Kingdom .
2122002 1/1984 United Kingdom .

Primary Examiner—Alan Cohan
Attorney, Agent, or Firm—Flynn, Thiel, Boutell & Tanis

[57] ABSTRACT

Apparatus for checking for steam leakage in a steam trap of the kind having a casing with an inlet for steam and condensate and an outlet for condensate, a condensate outlet valve, and actuating means for actuating the valve in the steam trap casing. A probe extends into the steam trap casing in noninterfering relation with the actuating means and responds to the level of condensate in the steam trap casing for changing an electrical condition. A monitor responds to the electrical condition for indicating the condition of the steam trap.

14 Claims, 10 Drawing Figures

STEAM TRAP CHECKER

FIELD OF THE INVENTION

This invention relates to apparatus for checking steam traps during operation, and more particularly for detecting failure of a steam trap.

BACKGROUND OF THE INVENTION

It is well known to use steam traps in order to trap or retain steam in a device or system, while permitting condensate to be removed. One specific type of steam trap is the inverted bucket-type steam trap which has been extensively utilized for controlling the flow of condensate from a steam heated unit to a condensate return line. Such traps are generally utilized to permit disposal of the condensate while at the same time minimizing loss of live steam from the steam heated unit.

Examples of steam traps are shown in U.S. Pat. Nos. 3,892,256, 4,096,876 and 4,149,557, all issued to the assignee of the present invention.

In conventional systems, as steam transfers its heat energy to a load, it condenses. A steam trap discharges the condensate, while retaining the steam within the system. However, as the steam trap wears out, it increasingly loses steam and wastes energy.

An inverted bucket steam trap fails when the valve therein leaks more condensate than is coming into the trap. When this occurs, the condensate level in the trap bucket is pushed down by the incoming steam until there is no longer any condensate inside the trap's bucket. The steam flows out under the bottom edge of the bucket and up through the space between the bucket and the adjacent wall of the trap casing, carrying part of the trap's condensate prime with it. This results in a loss of prime in the trap and in passage of live steam through the trap, namely undesirable steam loss by the trap.

Various device to monitor the condition of steam traps are known. These include visual monitoring of the discharge from the trap, monitoring of temperatures upstream and downstream of the trap and monitoring sounds emitted from the trap. These, as discussed in the opening remarks of U.S. Pat. No. 4,468,962, have not been entirely satisfactory. Further examples of steam trap monitoring devices include those which monitor flow upstream of the trap, such as devices disclosed in U.S. Pat. Nos. 4,305,548, 4,456,173 and 4,468,962 assigned to the assignee of the present invention. These involve placement of a vessel upstream from the steam trap in which vessel stream and condensate are separated and steam flow is monitored. These devices have operated satisfactorily but require installation of a separate vessel in the steam line upstream from the trap, involving extra equipment, installation costs and space requirements.

U.K. Pat. No. 2 022 846 and U.K. Application No. 2122 002 disclose apparatus for monitoring steam loss in a steam trap wherein, again, a separate vessel is placed upstream of the steam trap with provision for separating steam and condensate flow. In this instance, a probe located in the vessel includes an electrode located below the normal level of condensate in the vessel such that electric current can flow through the electrode, condensate and the conductive wall of the vessel. A single baffle between the inlet and outlet in that part of the vessel in which condensate can collect is perforated above the normal level of condensate in the vessel with a small steam escape hole. Excessive steam flow through the vessel results in a fall of the level of condensate on the inlet side of the baffle, at which the probe is located, and drops the level of condensate below the electrode of the probe. Since the electrode is otherwise electrically insulated from the wall of the vessel, electric current flow no longer takes place through the electrode, signaling an excessive flow of steam through the vessel and thereby indicating excessive steam loss from the trap downstream thereof and hence a faulty trap. However, since this system requires location of a separate vessel upstream of the steam trap, it involves extra equipment costs (for the vessel), installation labor and space along the steam line upstream of the trap. Moreover, this system monitors trap operation only indirectly, and not by measurement of actual steam flow, but rather by a secondary consideration, namely disturbance of condensate level in a vessel located upstream from the steam trap. Moreover, the level of condensate at the probe may change erratically as bubbles of vapor attempt to bypass the baffle by moving down through the condensate, which may produce an erratic on/off behavior in current flow through the probe in a manner not precisely representative of steam/condensate conditions in the steam trap downstream therefrom. Also, trap capacity and distance between the vessel and trap being checked can produce erratic on/off behavior in a manner not representative of the steam/condensate condition in the steam trap downstream therefrom.

Accordingly, the objects of the present invention include provision of a steam trap checker capable of checking the condition and performance of steam traps, and particularly inverted bucket steam traps; an apparatus as aforesaid in which a monitoring probe is inserted directly into the steam trap housing and which avoids any need for insertion of apparatus into the steam line upstream of the trap; an apparatus as aforesaid in which the structure added to the trap is compact and interferes neither with internal operation of the trap nor to any significant extent with space requirements outside the trap; an apparatus as aforesaid which can be added to existing stream traps in use in the field as well as being capable of incorporation into steam traps during manufacture; an apparatus as aforesaid which monitors steam trap internal operation directly by location of a probe directly within the steam trap in a predetermined relation to the normal steam/condensate interface within the trap such that internal conditions affecting operating parts of the steam trap also simultaneously and directly affect the probe as well; an apparatus as aforesaid which is of relatively low cost and high reliability; an apparatus as aforesaid in which various steam traps in a system can be provided each with its own probe but wherein a single monitoring circuit unit can be made to serve a plurality of such probes, either by connection to such plurality of probes through a selector switch for one-at-a-time selection of such probes or by providing such monitoring circuitry as a portable unit with a quick disconnect capability for being moved from probe to probe; and an apparatus as aforesaid in which the probe is readily removable from the steam trap casing for repair or replacement, and indeed wherein the probe can be replaced by a simple plug to leave the trap fully operational with the probe removed therefrom.

Other objects and purposes of the invention will be apparent to persons familiar with apparatus of this general kind upon reading the following specification and inspecting the accompanying drawings.

SUMMARY OF THE INVENTION

Apparatus for checking for internal steam leakage in a steam trap of the kind having a casing with an inlet for steam and condensate and an outlet for condensate, a condensate outlet valve and actuating means for actuating the valve in the steam trap casing. A probe extends into the steam trap casing in noninterfering relation with the actuating means and is responsive to the level of condensate in the steam trap casing for changing an electrical condition. Means responsive to the electrical condition indicate the condition of the steam trap.

DETAILED DESCRIPTION

Figure 1:
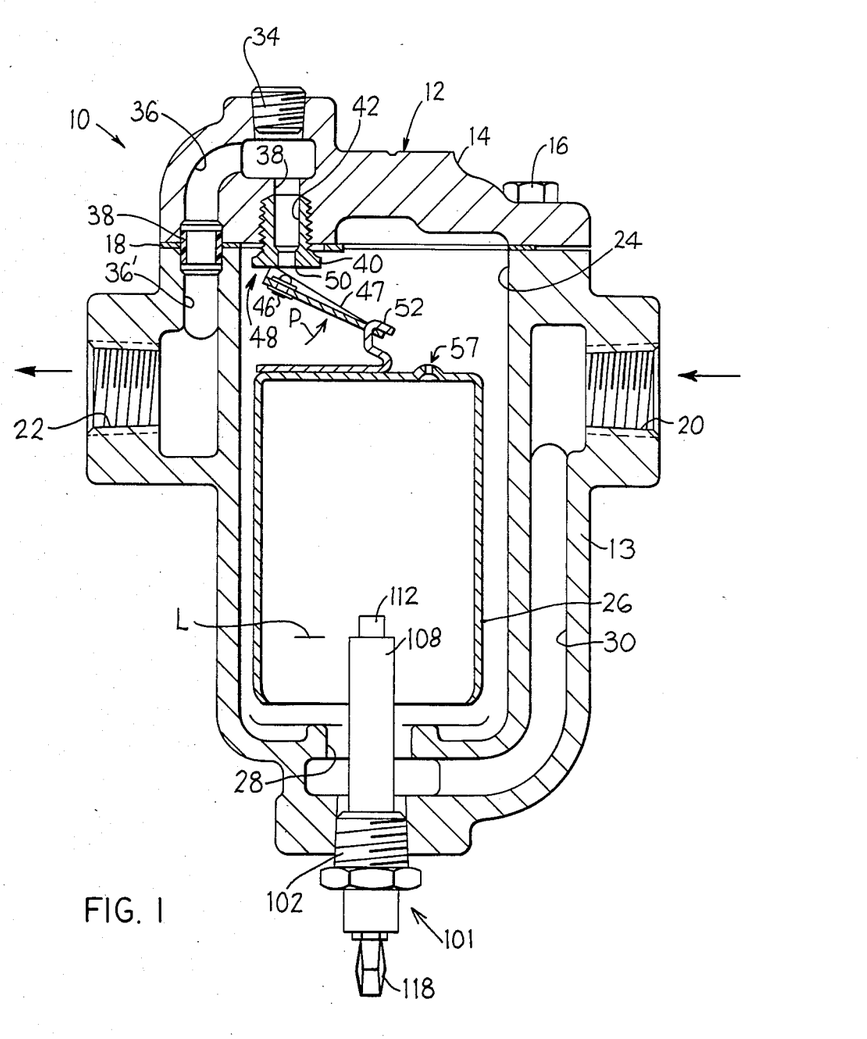
FIG. 1 is a central cross-sectional view of a steam trap incorporating a checker probe according to the present invention.

In FIG. 1, a conventional steam trap 10, here an inverted bucket steam trap, comprises a casing 12 having an upwardly opening base 13 normally closed by a removable cover 14 secured thereon by screws 16 with a gasket 18 establishing a seal therebetween. The casing base 13 has a steam and condensate inlet port 20 and a condensate outlet port 22, here both threaded, for connection in a steam line.

The base 13 of the casing 12 has an upward opening central chamber 24 in which is loosely vertically disposed an inverted bucket 26. A lipped central opening 28 communicates through the bottom of the base 13 from the central chamber 24 to outside the base 13. The rightward wall and bottom of the base 13 have disposed therein an L-shaped passage 30 communicating from the inlet port 20 to the lipped central opening 28 and thereby with the central chamber 24. The bottom of the central opening 28 is normally closed by a threaded pipe plug (not shown) below the passage 30, to avoid leakage of the contents of the central chamber and passage out of the casing 12. A similar pipe plug is seen at 34 in the upper left portion of the cover 14 and hereafter discussed.

A condensate outlet passage 36 is formed in the upper left portion of the cover 14 and is of inverted L shape. An opening 38 communicates through the top of the cover 14 into the left top portion of the central chamber 24. The top of the opening 38 is normally closed to the outside by the mentioned pipe plug 34 threaded therein. The inlet (upper and rightward) end of the condensate outlet passage 36 communicates with the central portion of the opening 38. A valve seat member 40 is externally threaded and is threaded into the lower end of the opening 38 to protrude downwardly somewhat from the bottom of the cover 14. The valve seat member 40 has a central through bore 42 which when open communicates between the central chamber 24 and conduit outlet passage 36. The outlet end portion 36' of the condensate outlet passage 36 extends down into the top left portion of the base 13 and communicates with the condensate outlet port 22. Conventional seal means 38 prevent leakage from the passage 36, 36' at the interface between the base 13 and cover 14.

The lower end of the central through bore 42 of the hollow pluglike valve seat member 40 forms a downwardly facing valve seat 50. A valve member 46 is secured to an operating lever assembly 47. The operating lever assembly 47 is pivotally mounted at 48 by a conventional means (not shown) for pivoting generally about a horizontal axis to move the valve member 46 into and out of sealing relation with the valve seat 50 defined by the lower end of the bore 42 in the valve seat member 40, the pivoting direction being generally indicated by the arrow P. The lower (rightward) end of the operating lever assembly 47 is perforated to pivotally receive therethrough an upstanding hook 52 fixedly upstanding from the top of the inverted bucket 26. The inverted bucket has, adjacent the hook 52, a small vent opening 57 to permit escape of gas from the upper end of the bucket at a slow controlled rate.

To the extent above described, the steam trap 10 is of a well known conventional type substantially similar to that illustrated in FIG. 5 of U.S. Pat. No. 4,149,557 above mentioned.

Figure 2:
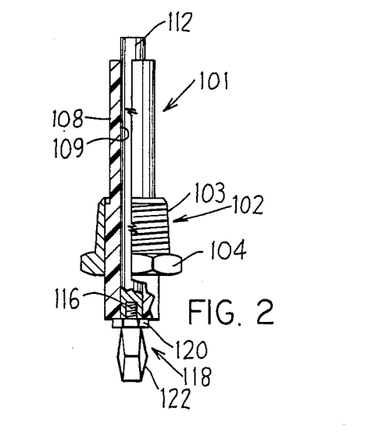
FIG. 2 is a side elevational view of the probe of FIG. 1.

Turning now more particularly to the special subject matter of the present invention, same includes a probe 101 (FIGS. 1 and 2). In the embodiment shown, the probe 101 is a conductance probe. The probe 101 comprises an externally threaded (in the embodiment shown, pipe threaded) mounting sleeve 102 provided at its lower end with perimetral flats 104 arranged in a preferably hexagonal array, like the flats on a conventional hex nut, so as to be engageable by a wrench. The threaded portion 103 of the mounting sleeve 102 extends above the perimetral flats 104 and is preferably tapered in the manner of a pipe plug.

Snugly fixed within the mounting sleeve 102 is an elongate electrically insulative hollow sleeve 108 which extends above and to a lesser extent below the corresponding ends of the mounting sleeve 102. Centrally fixed within the central through opening 109 of the sleeve 108 is an electrically conductive rod 112. The rod 112 protrudes above the top of the sleeve 108. The bottom of the rod 112 is in the present embodiment flush with the bottom of the sleeve 108 and coaxially threadedly receives therein the threaded mounting stud 116 of a conventional banana plug 118. The banana plug has a central multi-flatted, wrench engageable portion 120 and, depending therefrom, a plurality (here four) of resilient conductive leaves 122 joined together at their bottom edges and bulged outwardly at their central portions. Banana plugs are well known and are widely available devices often used to effect a quickly and easily disconnectable plug and socket connection between electrical wires and need no further description.

The components 102, 108 and 112 are sufficiently tightly sealed to each other that steam/condensate cannot enter therebetween. Thus, the only parts of the conductive mounting sleeve 102 and rod 112 in contact with condensate are the threaded upper end of the mounting sleeve 102, which engages the normally conductive metal material of the steam trap casing, and the exposed upper end of the rod 112.

Figure 3:
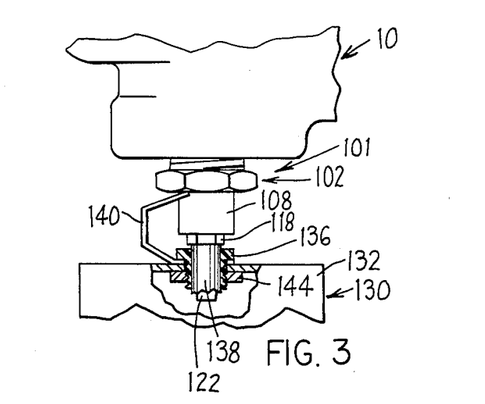
FIG. 3 is a fragmentary side elevational view disclosing the connection of a portable monitoring unit to the probe.

As seen in FIGS. 1 and 3, the probe 101 is installed in the bottom of the steam trap 10 by insertion of the upper portion of its rod 112 and sleeve 108 up through the central opening 28 in loose relation thereto until the upper end of the threaded portion 103 of the mounting sleeve 102 contacts the threaded lower end of the central opening 28, whereupon rotation of the probe in the desired direction threads the mounting sleeve 102 into the bottom of the central opening 28 in the steam trap 10 to effect a leak-tight closure of the bottom of the steam trap. Such installation leaves, as seen at FIGS. 1 and 3, the lower ends of the mounting sleeve 102 and insulating sleeve 108 and the banana plug 118 protruding from the bottom of the steam trap.

With the probe 101 installed in the steam trap 10 as seen in FIG. 1, the upper portions of the insulating sleeve 108 and rod 112 extend upward toward the bottom of the inverted bucket 26. With the bucket in its lower position shown, the elements 108 and 112 extend part way into the inverted bucket 26. The top of the insulated sleeve 108 is at a level indicated at L. Condensate liquid in the inverted bucket, if above the level L, will form an electrically conductive path therethrough between the exposed upper end of the rod 112 and the conductive metal wall of the steam trap base 13, and thereby with the conductive mounting sleeve 102. On the other hand, when the condensate liquid level is below the level L, condensate liquid does not contact the central conductive rod 112 of the probe and the rod 112 and mounting sleeve 102 are electrically isolated from each other.

If the steam trap 10 is operating properly, the condensate level therein should not fall below the level L. Accordingly, an electrically conductive path between the rod 112 and the mounting sleeve 102 indicates a trap 10 in proper operating condition and the lack of such a conductive path indicates a bad (failed open) trap, namely a trap wherein the valve 46, 50 has not properly closed and has leaked more condensate than is coming into the trap. As above discussed, when this occurs, the condensate level is pushed down in the bucket 26 by the incoming steam at 20 until there is no longer sufficient condensate inside the trap's bucket (i.e., condensate level below level L). Steam then flows out of the bucket beneath the bottom edge of the bucket and up through the space between the bucket and the side wall of the trap, carrying a part of the trap's condensate prime with it. This results in condensate prime loss in the trap and in consequent passage of steam through the trap, either through an improperly opened valve at 46, 50 or a flaw in the cover 1 and/or a failure in the gasket 18.

In any event, the relative electrical condition of the banana plug 118 connected to rod 112, and the bottom portion of the mounting sleeve 102 (electrically shorted or not) reflects the condition of the steam trap 10, namely good or bad.

FIGS. 3–6 disclose a simple, portable, hand-held monitor releasably connectable in sequence to a series of probes 101 on a respective series of traps to determine the condition of each of the traps. The monitor 130 comprises a suitable housing 132 in the top of which is mounted a conventional banana jack 134 compatible with and capable of receiving therein the insertion portion 122 of the banana plug 118 of the probe. As seen in FIG. 3, the banana jack comprises an insulated, top flanged sleeve 136 fixed to a conductive inner sleeve which snugly receives and electrically couples to the lower end 122 of the banana plug 118 inserted therein. A generally C-shaped, bent conductive metal leaf 140 is here anchored to the top of the housing 132 by the insulated sleeve 136 of the banana jack and extends upwardly therefrom to resiliently engage the conductive metal mounting sleeve 102 on the probe 101. In the embodiment shown, the housing 132 is of conducting metal. A nut 144 here fixes the banana jack to the top of the housing 132 by threaded engagement with the bottom portion of the insulating sleeve 136 thereof. The conductive relationship of the conductive sleeve 138 of the banana jack 134 and the monitor housing 132 is thus the same as the conductive relation between the probe mounting sleeve 102 and central rod 112.

Figure 4:
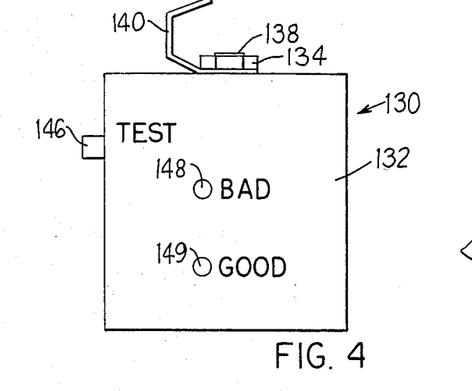
FIG. 4 is an elevational view of a portable monitoring unit.

In the embodiment shown in FIG. 4, the portable monitor 130 has a pushbutton test switch 146 manipulable from outside the housing 132 and "bad" and "good" indicator lights 148 and 149 visible from outside the monitor housing 132.

Figure 6:
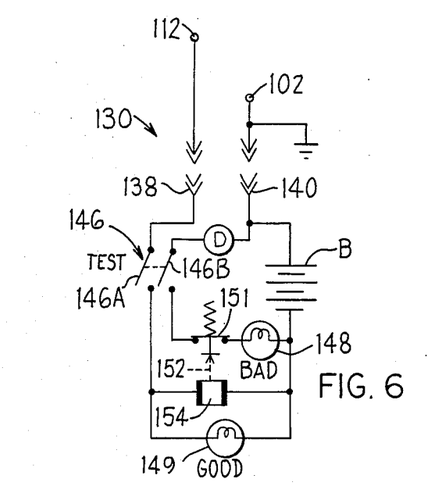
FIG. 6 is a schematic diagram of a simplified monitor circuit usable in the FIG. 4 monitor unit.

FIG. 6 schematically discloses a simple circuit for use in the monitor 130 above discussed. The exemplary FIG. 6 circuit comprises a battery B connecting in series a first circuit loop with the conductive sleeve 138 and conductive leaf 140, a first normally open set of contacts 146A of the test switch 146, and the good indicator light 149. The battery B is also connected in a second circuit loop with a conventional short time current delay device D (for example a simple coil), a second normally open contact 146B of the test switch 146, a resiliently biased closed (normally closed) relay contact 151 and the bad indicator light 148. The relay contact 151 is actuable to an open (nonconductive) condition, as indicated by the broken line 152, upon energization of a relay solenoid 154, the relay solenoid 154 being connected in parallel with the good lamp 149.

For simplicity, the FIG. 6 circuit has been illustrated in terms of electromagnetic circuit components. However, it will be apparent that the same functions can be implemented by solid state devices, for example in the form of an integrated circuit chip, or even, if desired, a software programmed microprocessor.

The FIG. 6 circuit operates as follows. With the condensate level above the level L in FIG. 1, the condensate makes a conductive connection between the elements 102 and 112. Upon closure of the test switch 146 a current path is completed from the battery B through elements 102 and 112, the test switch contacts 146A and the good lamp 149, igniting the latter and indicating that the steam trap is in proper operating condition. Note that closure of the test switch contact 146A also energizes the relay solenoid 154 to open the contact 151 thereof. Accordingly, by the time the delay device D connects the battery B to the closed test switch contact 146B, the contact 151 is open and thereby prevents current flow through the bad lamp 148. Accordingly, the bad lamp 148 does not ignite when the good lamp 149 ignites to show the steam trap 10 is in proper operating condition.

On the other hand, when the condensate level in the trap 10 is below the level L, no conductive path exists between the elements 112 and 102. Accordingly, closure of the test switch contact 146A has no effect since current cannot pass from the battery B therethrough. Thus, neither relay 154 or good lamp 149 is energized. However, the simultaneous closure of the test switch contact 146B permits current flow from the battery B through the delay device D and normally closed contact 151 and bad lamp 148, thereby igniting bad lamp 148 and indicating that the trap 10 is in a fault or bad condition.

The monitor 130 is compact enough to be carried in one's pocket or hand and thus can be brought to a succession of steam traps. Testing is carried out merely by energizing the monitor with the exposed end of the probe 101 of a steam trap such that the upper end 141 of the conductive leaf 140 is brought into contact with the bottom of the mounting sleeve 102 as the conductive lower end 122 of the banana plug 118 firmly seats within the conductive sleeve of the banana jack on the top of the monitor housing 132. Once so interengaged with the probe 101, the test switch pushbutton 146 is pushed by the operator and the condition of the steam trap is displayed by ignition of either the bad or good lamps 148 and 149.

MODIFICATION

Figure 7:
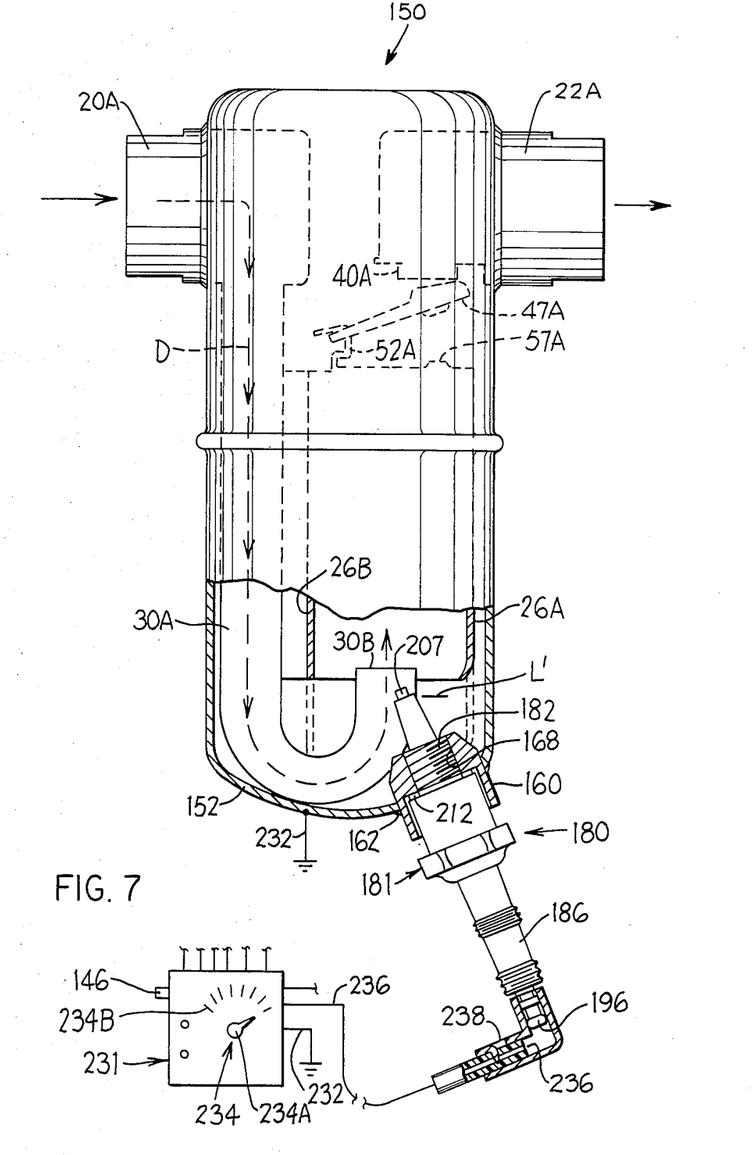
FIG. 7 is a partially broken elevational view of a second type of steam trap embodying the invention and utilizing a modified probe.

FIG. 7 discloses a further inverted bucket steam trap 150 of the type shown in U.S. Pat. No. 4,149,557 assigned to the assignee of the present application. The steam trap 150 is of welded stainless steel sheet construction and the inlet passage 30A thereof is formed as a generally J-shaped tube extending from communication with an inlet fitting 20A defining the inlet port. Incoming steam and condensate flows through the J-shaped tube 30A in the direction of the arrow D. The J-shaped tube 30A has an upturned outlet end 30B which opens upward into the open bottom end of the inverted bucket 26A. The vertical wall of the inverted bucket 26A is recessed on its leftward side to create a vertical channel 26B in which the leftward, input portion of the J-shaped tube is loosely received. Rather than having a detachable cover as at 14 in FIG. 1, the trap 150 has a fixed cylindrical outlet fitting 22A extending rightward therefrom and carrying the outlet port. The inner leftward end of the outlet fitting 22A carries a valve seat member and operating lever arm respectively indicated in broken line at 40A and 47A, preferably identical to the corresponding members 40 and 47 of FIG. 1. The lower end of the lever arm 47A is attached by means of a hook 52A to the top of the inverted bucket 26A and the inverted bucket has a vent opening 57A, all preferably identical to the corresponding structure at 47, 52, 57 in FIG. 1. The bucket 26A in FIG. 7 is shown approaching its upper, valve closing position, in contrast to the FIG. 1 inverted bucket 26 which is in a lowered position. The basic operation of the steam trap of FIG. 7 is the same as that discussed above in connection with FIG. 1.

Turning now more particularly to the details of the invention in FIG. 7, it will be noted that the steam trap 150 differs from the steam trap 10 of FIG. 1 in having no bottom outlet capable of receiving a plug, and also in having the J-shaped tube 30A occupying the space adjacent and immediately above the center portion of the bottom wall 152 of the steam trap 150. Accordingly, in the FIG. 7 steam trap, it is not possible to locate a probe in the manner shown in FIG. 1. FIG. 7 accordingly shows a modified probe mounting, as well as a modified probe construction.

More particularly, an annular adapter 160 (FIGS. 7 and 9) is fixedly secured, preferably by welding as at 162, to extend through an opening 164 cut in the bottom wall portion 152 of the housing of the steam trap 150. Adapter 160 can be somewhat angled with respect to the bottom wall of the steam trap as in FIG. 9 but is preferably arranged as shown in FIG. 7 wherein the adapter 160 is spaced from the center of the trap bottom wall 152 and is angled toward the central portion of the open bottom of the inverted bucket 26A. The adapter 160 comprises a downwardly and outwardly opening recess 166 and a threaded bore 168 coaxially communicating from the recess 166 through to the inner end of the adapter 160. The threaded bore 168 and recess 166 together constitute an axial opening through the adapter 160. The adapter 160 permits mounting of a probe 180 in the thin sheet metal bottom wall of the steam trap 150 in such a way as to avoid contact between the probe and internal steam trap structure such as the J-shaped tube 30A, while still permitting the probe to lie below the open bottom of the inverted bucket 26A and thereby permit the probe to monitor the condensate level within the bucket.

Figure 8:
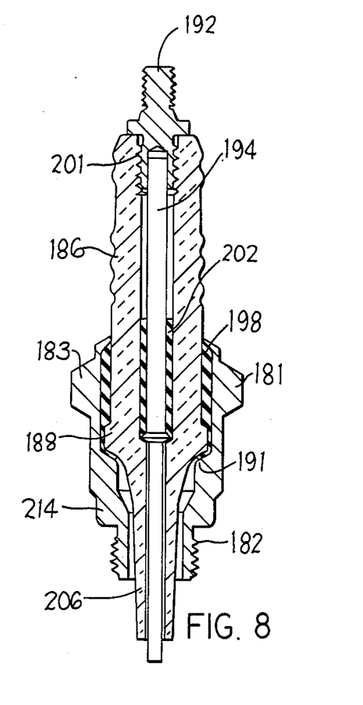
FIG. 8 is an enlarged central cross-sectional view of the FIG. 7 modified probe.

A probe of the kind generally shown in FIG. 1 can be dimensioned for use in a trap of the kind shown in FIG. 7, and it is also possible in either embodiment to use a modified probe like that shown at 180 in FIGS. 7 and 8. The probe 180 has a construction similar to that found in automotive spark plugs, except as hereafter noted. More particularly, the probe 180 has a conductive metal outer shell 181. The outer shell 181 has a reduced diameter, externally threaded end portion 182 for threadedly engaging in the threaded bore 168 of the adapter 160. The outer shell 181 at its other end has an enlarged diameter flatted surface 183 engageable by a conventional wrench for tightening or loosening threaded engagement at 168, 182.

An electrically insulative ceramic intermediate shell at 186 extends through the metal outer shell 181 and beyond the opposite ends thereof. An annular rib 188 on the intermediate portion of the ceramic shell 186 is received on a step 191 disposed in the central passage through the outer shell 181.

A central conductive rod 194 has a conductive end member 196 fixed thereatop to define a central electrode assembly 194, 196. The central electrode assembly 194, 196 protrudes beyond the ends of the ceramic shell 186, the end member 196 being exposed at one end (the upper end in FIG. 8) and the opposite end of the rod 194 being exposed at the other end of the ceramic shell 186 to define a center electrode.

The ceramic shell 186 is fixed within the metal outer shell 181 by a sealant-adhesive 198. The central electrode assembly 194, 196 is fixed within the ceramic shell 186 by threaded engagement of the latter with the end member 196 at 201 and by sealant material 202 centrally in the intermediate member 186.

The FIG. 8 probe construction differs from a conventional automotive spark plug primarily in that the ceramic shell 186 is extended substantially beyond the threaded end portion of the metal outer shell 181, as indicated at 206, and the center electrode 207 extends somewhat farther than usual for a spark plug, from the ceramic tip 206. Further, no side electrode is provided on the threaded end portion 182.

Figure 9:
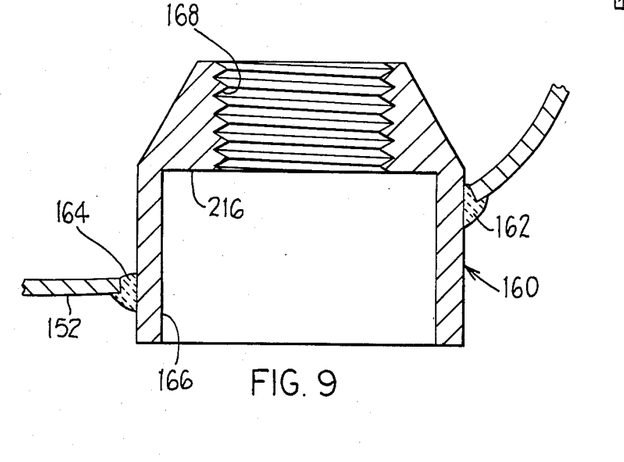
FIG. 9 is an enlarged cross-sectional view of an adapter for securing a probe to a thin wall steam trap housing.
Figure 10:
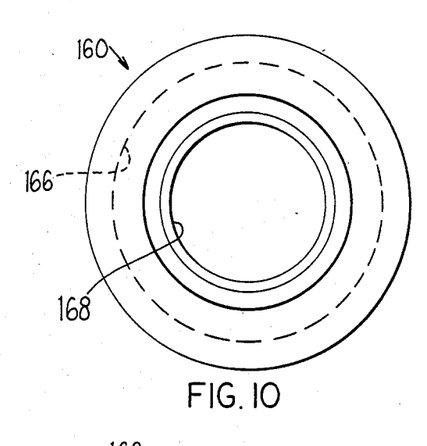
FIG. 10 is a top view of the FIG. 9 adapter.

With the adapter 160 installed, as by welding, through the bottom wall 152 of the steam trap 150, the threaded bore 168 may, if desired, by closed by a conventional pipe plug or the like. Normally, however, a probe, such as probe 180, is inserted through the recess 166 and threaded with its threaded end portion 182 into the threaded bore 168 to effect a snug leakproof fit, same being facilitated, if desired, by a conventional spark plug compression washer 212 compressed between opposed shoulders 214 and 216 on the metal outer shell 181 of the probe 180 and in the bottom of the recess 166 of the adapter 160. The probe 180 so installed thus has its outer shell 181 in electrically conductive relation with the adapter 160 and bottom wall 152 of the trap 150, and further has its center electrode 207 exposed for liquid contact with condensate in the bottom portion of the steam trap 150, the center electrode 207 being electrically insulated from the trap bottom wall 152 by the ceramic sleeve 186.

Figure 5:
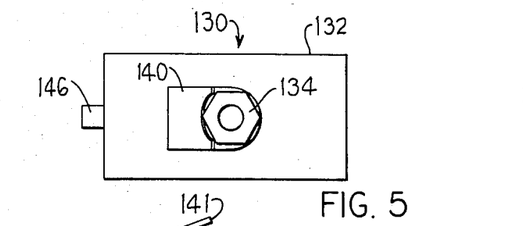
FIG. 5 is a top view of the FIG. 4 unit.

A portable monitor like that at 130 in FIGS. 4–6, by appropriate modification of its jack structure 134 and conductive leaf 140, can be used to monitor the probe 180 in the manner above described with respect to the probe 101. In that instance, the jack 134 would be provided with a resilient version of the conductive inner sleeve 138 of FIG. 3 to conductively engage the conductive end member 196 of FIG. 7. Further, the FIG. 3 conductive leaf 140 would be extended to reach and resiliently engage the conductive outer shell 181 of FIG. 7. The operation is otherwise the same as described above with respect to FIGS. 5–6.

Instead of using a portable hand-held monitor, like that at 130, it is also contemplated that a plurality of steam traps (for example like those of FIGS. 1 and 7) can be remotely monitored from a central location by a single monitor, such as that shown at 231 in FIG. 7. In the embodiment shown, the central monitor 231 has an internal circuit which may be similar to the circuit of monitor 130 in FIG. 6 with the following exceptions. First, rather than a quick-release plug and socket type ground connection as at 140 in FIG. 6, the central monitor 231 may be connected to a conductive ground indicated at 232 and formed by the casings 30A of each of the traps which it is to monitor or may be grounded by the nature of steam/condensate lines. Further, rather than the quick-release plug and socket type connection 138 of FIG. 6, the central monitor 231 is provided with a conventional selector switch 234 having a movable contact 234A shiftable alternately to each of a plurality of fixed contacts 234B each terminating in a respective conductive line 236. Each of the several lines 236 electrically terminates in a conductive cap 238 removably conductively engaging the conductive end member 196 of the probe 180 (or similarly engaging the conductive member 122 of the probe 101 of FIG. 2). Thus, rather than moving a portable monitor unit 130 into engagement with the end of a probe protruding from the steam trap as in FIG. 3, the central monitor 231 electrically connects to the desired one of a plurality of probes by positioning of the movable contact 234A of the switch 234 into conductive engagement with the corresponding one of its contacts 234B connected to the line 236 going to the particular probe to be monitored, whereafter testing proceeds by the method discussed above with respect to FIG. 6, which is initiated by the operator's pressing of the test switch 146.

The operation of the probe 180 of FIG. 7 in monitoring the condition of the steam trap 150 is substantially as described above with respect to the probe 101 of FIG. 1. Thus, in FIG. 7, a condensate level above the level L' permits electric current flow from the monitor through the condensate path between the exposed tip of the central electrode 207 and the conductive casing 30A (or at least the adapter 160), while dropping of condensate below the level L' leaves the exposed end of the central electrode 207 exposed only to vapor within the trap and not condensate and hence breaks the electrically conductive path between the central electrode 207 and casing 30A, condensate levels above level L' indicating a properly operating trap and condensate levels below level L' indicating a defect.

While probes of conductive type have been disclosed herein, it is also contemplated that probes of other types could be substituted. For example, the central electrode 112 or 207 might be replaced with a temperature sensor such as a thermocouple connected at one side to the outer shell 102 or 181 and at its other side to the end member 122 or 196. In that instance, the FIG. 6 monitor circuit can be replaced with a conventional thermocouple readout. Alternately, it is contemplated that an appropriately programmed microprocessor could convert a temperature reading to an associated saturated steam pressure.

To briefly summarize operation of the inventive apparatus, when an inverted bucket trap begins to fail, the valve system 46, 50 will allow more condensate to flow past the valve, though the latter is supposed to be in its closed position, than is being fed to the trap. This causes incoming steam to fill the inverted bucket which exposes the tip 112, 207 of the probe 101, 180, breaking the conductive path through the probe and permitting means such as the monitor 130 or 231 to accurately show that the inverted bucket steam trap has or will shortly fail.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a steam trap and apparatus for checking same for steam leakage, comprising:

a steam trap casing having an inlet for steam and condensate and an outlet for condensate;

a steam trap means in said casing operative independent of said probe and by itself responsive to accumulation of a preselected amount of condensate in said casing for releasing condensate to said outlet while trapping steam in said casing, said steam trap means constituting the entirety of a normally operational steam trap mechanism including a condensate outlet valve normally closing said outlet and actuating means for actuating said valve to release condensate therethrough to said outlet;

a probe extending into said steam trap casing and responsive to condensate build up to an excessive level in said steam trap casing for changing an electrical condition;

means responsive to said electrical condition change for indicating said steam trap means has a fault condition, said steam trap comprising an inverted bucket steam trap, said actuating means comprising a downward opening inverted bucket vertically movable in said casing, a passage from said inlet which opens under said inverted bucket to supply steam and condensate, means connecting said condensate outlet valve to said inverted bucket for opening and closing said valve in response to low and high positioning of said inverted bucket in said steam trap casing, said probe having a condensate level sensing part extending up in noninterfering relation into the open bottom of said inverted bucket and responsive to the condensate level within said inverted bucket.

2. The apparatus of claim 1 in which said probe is substantially vertically threaded into the bottom of said steam trap casing, said probe having a tip extending up into the open bottom end portion of said inverted bucket through the outlet portion of said passage.

3. The apparatus of claim 1 in which said passage comprises a J-shaped tube extending downward in said casing from said inlet and substantially parallel to said bucket, said tube having a hook part of U shape receiving the bottom edge of said bucket loosely therein, said tube having an outlet portion opening upward adjacent the open bottom of said bucket, said probe and said outlet portion of said tube extending upward side by side toward the open bottom of said inverted bucket.

4. The apparatus of claim 1 including an annular adapter internally threaded to sealingly receive a corresponding threaded part on the outside of said probe, said annular adapter being of electrically conductive material capable of being welded in an opening in the steam trap casing.

5. An apparatus for checking for steam leakage in an inverted bucket steam trap of the kind having a casing incorporating an inlet for steam and condensate and an outlet for condensate, a condensate outlet valve associated with said outlet, a downward opening inverted bucket vertically movable in said casing, a passage from said inlet which opens under said inverted bucket to supply steam and condensate, means connecting said condensate outlet valve to said inverted bucket for opening and closing said valve in response to low and high positioning of said inverted bucket in said steam trap casing, a probe having a conductive level sensing part extending upward in noninterfering relation into the open bottom of said inverted bucket and responsive to the condensate level within said inverted bucket for changing an electrical condition;

means responsive to said electrical condition for indicating the condition of said steam trap.

6. The apparatus of claim 5 in which said probe comprises an externally threaded annular mounting sleeve of electrically conductive material engaged in an opening in said steam trap casing adjacent the bottom end of said inverted bucket, an electrically insulative sleeve coaxially sealingly fixed in said externally threaded mounting sleeve and protruding beyond the ends thereof, an electrically conductive central rod coaxially sealingly fixed in said insulating sleeve and protruding beyond the ends thereof to expose a sensing tip at the open bottom end portion of said inverted bucket and an electric terminal outside said steam trap casing.

7. The apparatus of claim 6 including an annular adapter internally threaded to sealingly receive said mounting sleeve, said annular adapter being of electrically conductive material capable of being welded in an opening in said steam trap casing.

8. The apparatus of claim 6 wherein said means responsive to said electrical condition comprise a portable hand-held monitor, and mating quick-connect means on said probe electrical terminal and on said monitor for monitoring the condition of plural traps with the same monitor alternatively.

9. The apparatus of claim 6 in which said means responsive to said electrical condition comprise a central monitor connected to probes of a plurality of steam traps, said central monitor having switch means actuable to select a desired probe to be monitored.

10. In combination, a steam trap and apparatus for checking same for steam leakage, comprising:
a steam trap casing having an inlet for steam and condensate and an outlet for condensate;
a probe extending into said steam trap casing and responsive to build up an excessive level in said steam trap casing for changing an electrical condition;
a steam trap means in said casing operative independent of said probe and by itself responsive to accumulation of a preselected amount of condensate in said casing for releasing condensate to said outlet while trapping steam in said casing, said steam trap means constituting the entirety of a normally operational steam trap mechanism including a condensate outlet valve normally closing said outlet and actuating means for actuating said valve to release condensate therethrough to said outlet; and
means responsive to said electrical condition change for indicating said steam trap means has a fault condition.

11. The apparatus of claim 10 in which said probe comprises an externally threaded annular mounting sleeve of electrically conductive material engaged in an opening in said steam trap casing, an electrically insulative sleeve coaxially sealingly fixed in said externally threaded mounting sleeve and protruding beyond the ends thereof, an electrically conductive central rod coaxially sealingly fixed in said insulating sleeve and protruding beyond the ends thereof to expose a sensing tip and an electric terminal outside said steam trap casing.

12. The apparatus of claim 11 including an annular adapter internally threaded to sealingly receive said mounting sleeve, said annular adapter being of electrically conductive material capable of being welded in an opening in said steam trap casing.

13. The apparatus of claim 10 wherein said means responsive to said electrical condition for indicating comprise a portable hand-held monitor, and mating quick-connect means on a portion of said probe outside said casing and on said monitor for monitoring the condition of plural traps with the same monitor alternatively.

14. The apparatus of claim 10 in which said means responsive to said electrical condition for indicating comprise a central monitor connected to probes of a plurality of steam traps, said central monitor having switch means actuable to select a desired probe to be monitored.

* * * * *